US010757933B2

(12) United States Patent
Ulibarri

(10) Patent No.: US 10,757,933 B2
(45) Date of Patent: Sep. 1, 2020

(54) COMPOSITIONS AND METHODS FOR DIRECTING THE OVIPOSITION OF MOSQUITOES

(71) Applicant: Laurentian University of Sudbury, Sudbury, Ontario (CA)

(72) Inventor: Gerardo Ulibarri, Whitefish (CA)

(73) Assignee: Laurentian University of Sudbury, Ontario (CA)

( * ) Notice: Subject to any disclaimer, the term of this patent is extended or adjusted under 35 U.S.C. 154(b) by 192 days.

(21) Appl. No.: 14/763,799

(22) PCT Filed: Jan. 28, 2014

(86) PCT No.: PCT/CA2014/000050
§ 371 (c)(1),
(2) Date: Jul. 27, 2015

(87) PCT Pub. No.: WO2014/113876
PCT Pub. Date: Jul. 31, 2014

(65) Prior Publication Data
US 2015/0359215 A1    Dec. 17, 2015

Related U.S. Application Data

(60) Provisional application No. 61/757,418, filed on Jan. 28, 2013.

(51) Int. Cl.
| A01N 25/00 | (2006.01) |
| A01N 37/02 | (2006.01) |
| A01N 65/20 | (2009.01) |
| A01N 59/00 | (2006.01) |
| A01N 37/12 | (2006.01) |
| A01N 61/00 | (2006.01) |
| A01N 37/00 | (2006.01) |
| A01N 43/16 | (2006.01) |
| A01N 59/26 | (2006.01) |
| A01N 37/36 | (2006.01) |
| A01N 27/00 | (2006.01) |
| A01N 63/10 | (2020.01) |
| A01N 37/14 | (2006.01) |

(52) U.S. Cl.
CPC ............ *A01N 25/00* (2013.01); *A01N 27/00* (2013.01); *A01N 37/00* (2013.01); *A01N 37/02* (2013.01); *A01N 37/12* (2013.01); *A01N 37/14* (2013.01); *A01N 37/36* (2013.01); *A01N 43/16* (2013.01); *A01N 59/00* (2013.01); *A01N 59/26* (2013.01); *A01N 61/00* (2013.01); *A01N 63/10* (2020.01); *A01N 65/20* (2013.01); *Y02A 50/328* (2018.01); *Y02A 50/329* (2018.01); *Y02A 50/33* (2018.01)

(58) Field of Classification Search
CPC ........ A01N 25/00; A01N 37/14; A01N 43/16; A01N 37/00; A01N 65/20; A01N 63/02; A01N 61/00; A01N 59/26; A01N 59/00; A01N 37/36; A01N 37/12; A01N 37/02; A01N 27/00; Y02A 50/33; Y02A 50/328; Y02A 50/329
See application file for complete search history.

(56) References Cited

U.S. PATENT DOCUMENTS

| 3,930,039 | A | * | 12/1975 | Kuipers | ............... A23C 9/1425 426/271 |
| 3,997,999 | A | | 12/1976 | Evans | |
| 4,803,289 | A | | 2/1989 | Laurence et al. | |
| 4,844,892 | A | | 7/1989 | Laurence et al. | |
| 4,855,133 | A | * | 8/1989 | Kamei | ................. A01N 25/006 424/84 |
| 5,896,697 | A | | 4/1999 | Kang | |
| 6,708,443 | B2 | | 3/2004 | Hall | |
| 6,990,768 | B1 | | 1/2006 | Boston | |
| | | | | (Continued) | |
| 7,045,138 | B2 | * | 5/2006 | Kennedy | .............. A01N 25/006 424/405 |
| 8,133,524 | B1 | | 3/2012 | Acar et al. | |
| 2008/0003197 | A1 | | 1/2008 | Bette | |
| 2008/0274076 | A1 | | 11/2008 | Prakash et al. | |
| 2009/0148399 | A1 | | 6/2009 | Bette | |
| 2010/0192451 | A1 | | 8/2010 | Ponnusamy et al. | |
| 2012/0148705 | A1 | | 6/2012 | Acar et al. | |

FOREIGN PATENT DOCUMENTS

| CA | 2631437 A1 | 5/2007 |
| CA | 2623601 A1 | 6/2008 |

(Continued)

OTHER PUBLICATIONS

Harland, effect of heat treatment on whey, J. Dairy Sci. p. 879 (Year: 1945).*

(Continued)

*Primary Examiner* — Matthew P Coughlin
*Assistant Examiner* — Thurman Wheeler
(74) *Attorney, Agent, or Firm* — McDermott, Will & Emery LLP; Judy M. Mohr; Wen Li

(57) ABSTRACT

Compositions described herein are purposed to attract gravid mosquitoes to oviposit in a preferred environment. The composition for directing the oviposition of mosquitoes comprises one or more attractants and N—P—K additive, wherein the N—P—K additive is mixture that contain chemical elements nitrogen, phosphorus and potassium. The attractants can be modified to provide a composition for facilitating the oviposition of different kind of mosquito. The composition described above, can be modified to provide a composition for facilitating the oviposition of the *Anopheles* species of Culicidae. The composition can also include cooked whey, n-heneicosane and/or tetradecanoic acid methyl ester to provide a composition for facilitating the oviposition of the *Aedes* species of Culicidae. The composition can also be modified to provide a composition for facilitating the oviposition of the *Culex* species of Culicidae.

17 Claims, 5 Drawing Sheets

(56) References Cited

FOREIGN PATENT DOCUMENTS

| | | | |
|---|---|---|---|
| CA | 2756221 A1 | 10/2010 | |
| EP | 0078641 A1 | 11/1983 | |
| EP | 1850666 B1 | 7/2007 | |
| WO | WO 2014/113876 A1 | 7/2014 | |

OTHER PUBLICATIONS

Darriet and Corbel, "[Aedes aegypti oviposition in response to NPK fertilizers]", Parasite, vol. 15, No. 1, pp. 89-92 (2008) *French language with English Summary*.

Darriet et al., "[Influence of plant matter and NPK fertilizer on the biology of Aedes aegypti (Diptera: Culicidae)]", Parasite, vol. 17, No. 2, pp. 149-154 (2010) *French language with English Summary*.

International Search Report from PCT Patent Application No. PCT/CA2014/000050 dated Apr. 29, 2014, application now published as International Publication No. WO2014/113876 on Jul. 31, 2014.

Navarro-Silva et al., "Review of semiochemicals that mediate the oviposition of mosquitoes: a possible sustainable tool for the control and monitoring of Culicidae", Rev. Bras. Entomol., vol. 53, No. 1, pp. 1-6 (2009).

Ritchie, "Effect of some animal feeds and oviposition substrates on Aedes oviposition in ovitraps in Cairns, Australia", J. Am. Mosq. Contr. Assoc., vol. 17, No. 3, pp. 206-208 (2001).

Sharma et al., "Oviposition responses of Aedes aegypti and Aedes albopictus to certain fatty acid esters", Parasitol Res., vol. 103, No. 5, pp. 1065-1073 (2008).

Sharma et al., "Mediation of oviposition responses in the malaria mosquito Anopheles stephensi Liston by certain fatty acid esters", Parasitology Research, Vo. 104, No. 2, pp. 281-286 (2009).

Deng, "Attractants for oviposition of Culex pipiens pallens and Aedes albopictus" Doctoral Dissertation, Ch. 2, pp. 23-32 (2008) *Chinese Language Document with English Abstract* p. 32.

Zhang, "Chemical factors affecting oviposition behaviour of mosquitoes". Acta Parasitol. Med. Entomol. Sin., vol. 1, No. 2, pp. 61-67 (1994) *Chinese Language Document with English Abstract* p. 67.

\* cited by examiner

[(2S)-2-acetoxydodecyl] butanoate

[(2S)-2-acetoxydodecyl] propanoate

[(2S)-2-acetoxydodecyl] (2R)-2-hydroxybutanoate
(lactic acid ester)

A series

R=CH$_3$, CH$_2$CH$_3$, Ph, 4-methylPh butyl (2S)-2-acetoxydodecanoate propyl (2S)-2-acetoxydodecanoate propyl (2S)-2-phenoxydodecanoate B series n=(CH$_2$)a where a=1-10, total chain length=1-10, preferably 3C
m=(CH$_2$)b where b=1-10, total chain length=1-20 preferably 18C

COMPOSITIONS AND METHODS FOR DIRECTING THE OVIPOSITION OF MOSQUITOES

CROSS-REFERENCE TO RELATED APPLICATIONS

This application is a U.S. National Stage of International Patent Application No. PCT/CA2014/000050, filed Jan. 28, 2014, which claims priority to U.S. Provisional Patent Application No. 61/757,418, filed Jan. 28, 2013, each of which is hereby incorporated by reference in its entirety.

FIELD OF THE INVENTION

The present invention generally relates to mosquito attractants and methods of using the same. More specifically, the invention relates to compositions and methods for directing mosquitoes to a target, such as mosquito traps, an artificial breeding pool or ovitrap. More specifically, the invention relates to compositions and methods for directing the oviposition of mosquitoes to a specific site.

BACKGROUND OF THE INVENTION

Besides being a general nuisance to human beings, mosquitoes, specifically Culicidae (mosquito), are vectors of many diseases throughout the world. In an effort to eliminate insect-borne diseases, such as West Nile virus, malaria and dengue fever, a global effort has been made to diminish or eliminate these insects from areas inhabited by humans.

The most frequently applied methods in the struggle against the Culicidae are biological insecticides, *Bacillus thuringiensis* and *Bacillus sphaericus*, together with chemicals, such as the organophosphates and pyrethroids. However, because of the obvious environmental impact, these methods are not ideal. Moreover, it is well documented that mosquitoes can develop resistance to these measures over time. As such, these programs are not sustainable in the long run.

More environmentally friendly methods of controlling mosquito populations have looked at trapping or destroying the eggs or larvae before they have a chance to mature or capturing the gravid female before or after laying its eggs. In some cases, this has involved providing artificial breeding pools that attract gravid mosquitoes and eliminate the eggs or larvae from the pool before the mosquitoes mature and become airborne.

For example, U.S. Pat. No. 6,708,443 discloses an apparatus where the artificial breeding pool contains a filter that traps the eggs and larvae and then exposes the captured biomass to air causing the biomass to dry and thus be eliminated. U.S. Pat. No. 6,990,768 discloses a similar apparatus with the exception that the filter is provided in the form of a belt that captures the biomass and then passes it through a crushing mechanism to eliminate the eggs and larvae.

Efforts to provide a breeding pool where mosquitoes are allowed to mature, but are trapped before they enter the environment, have also been made. For example, U.S. Pat. No. 5,896,697 discloses an artificial breeding pool where the eggs are trapped behind a screen that prevents the newly hatched mosquitoes from escaping into the environment. U.S. Pat. No. 3,997,999 discloses an apparatus that traps newly hatched mosquitoes in a separate column from where the eggs were laid.

Although standing water will naturally attract most insects that rely on water to lay their eggs, chemical attractants can be added to the water to increase the attractiveness of the pool to the gravid insect. For example, US Patent Publication No. 2008/0003197 discloses a controlled release attractant for use in an artificial breeding pool. Still, there is a need to develop artificial attractants used in the artificial breeding pool to attract gravid mosquito.

Nowadays, there is a greater realization that specific species of mosquitoes are attracted to unique attractants, in particular chemoattractants, and prefer to lay their eggs in a pool of water that are inhabited by their own species. As such, there is a need to develop attractant such as artificial chemoattractants that effectively attract specific species of mosquitoes.

SUMMARY OF THE INVENTION

It is an object of the invention to provide compositions and methods that facilitate the oviposition of mosquitoes.

According to an aspect of the present invention, a composition for directing the oviposition of mosquitoes is provided. The composition comprises one or more attractants and a nitrogen, phosphorus and potassium (N—P—K) additive. In one embodiment, the elements nitrogen, phosphorus and potassium of N—P—K additive are presented in the form of $NH_4^+$, $PO_4^{3-}$ and $K^+$, but other salts/compound can also be used, such as amino acids, nitrates, other amines, etc.

In this application, N—P—K additive is a mixture or a compound that contains the chemical elements nitrogen, phosphorus and potassium.

In this application, NPK value is used to indict the contents of N, P and K in the N—P—K additive. As used to label fertilizer, NPK value is based on the relative contents of the chemical elements nitrogen (N), phosphorus (P), and potassium (K), wherein, the N value is the percentage of elemental nitrogen by weight in the N—P—K additive, and the values for P and K represent the percentage by weight of oxide in the forms of $P_2O_5$ and $K_2O$.

The attractants may be one or more known semiochemicals or natural mosquito attractants. The attractant may be chosen based on the species of the targeted mosquitoes. The attractants could be known attractants that are used for attracting different kinds of gravid female mosquito and to induce them to deposit their eggs at the site. According to another aspect of the present invention, one or more synthetic attractants for oviposition of specific species of mosquitoes are also provided. These attractants include analogues of known oviposition pheromones. Another attractant for facilitating the oviposition of the *Aedes* species of mosquitoes is whey, especially cooked whey. The efficiency of these attractants for attracting gravid mosquitoes can also be enhanced by including the N—P—K additive to the mixture.

According to another aspect of the present invention, there is provided methods for producing the analogue of the known oviposition pheromone.

According to another aspect of the present invention, there is provided a method for facilitating the oviposition of mosquitoes comprising providing one or more of the compositions or attractants described above to the oviposition.

The composition may be provided in a concentrated form (i.e., in a form that requires dilution prior to use or which is diluted upon delivery to the site of use) or in a dilute form that is suitable for use without dilution. The composition may be provided by directly dissolving the composition in water or by suspending a small package of the composition in water.

In one embodiment, the the N—P—K additive is a fertilizer

In another embodiment, the NPK value of the N—P—K additive is in the range of 10-25:10-30:10-25. Preferably, the NPK value of the N—P—K additive is 17:23:17 or 18:24:16.

In a further embodiment, the one or more attractants are selected from: carboxylic acids and esters, alkyl aldehyde, amine compound, phenol compound, indole compounds, and other natural or synthetic mosquito attractants. For example, the one or more attractants are selected from: decanoic acid, dodecanoic acid, tetradecanoic acid, tetradecanoic acid methyl ester, hexadecanoic acid, hexadecanoic acid methyl ester, propyl octadecanoate, n-heneicosane, nonaldehyde, triethylamine, p-cresol, 3-metylindole, 4-metylindole, cooked whey and dehydrated alfalfa.

In a yet further embodiment, the attractants comprise propyl octadecanoate at a concentration of 1-50 mg propyl octadecanoate per 100 mg N—P—K additive.

In another embodiment, the attractants comprise cooked whey at a concentration of 1-10 ml cooked whey per 100 mg N—P—K additive.

In a yet further embodiment, the attractants further comprise n-heneicosane, at a concentration of 1-100 mg n-heneicosane per 100 mg N—P—K additive.

In a still further embodiment, the attractants further comprise propyl octadecanoate at a concentration of 1-50 mg per 100 mg N—P—K additive or tetradecanoic acid methyl ester at a concentration of 1-100 mg per 100 mg N—P—K additive or a combination thereof.

In another embodiment, the attractants further comprise propyl octadecanoate at a concentration of 10 mg per 100 mg N—P—K additive or tetradecanoic acid methyl ester at a concentration of 10 mg per 100 mg N—P—K additive or a combination thereof.

In an embodiment, the attractants comprise dehydrated alfalfa at a concentration of 1-2.5 g dehydrated alfalfa per 100 mg N—P—K additive.

In another embodiment, the attractants further comprise yeast at a concentration of 0.1-0.25 g yeast per 100 mg N—P—K additive.

In a still further embodiment, the attractants further comprise nonanal and p-cresol at a concentration of 1-2.5 mg Nonanal or 1-2.5 mg p-cresol per 100 mg N—P—K or a combination of both.

According to another aspect of the invention, there is provided an attractant for facilitating the oviposition of the *culex* species of mosquitoes, wherein the attractant is cooked whey, which is heated to get rid some or all of the protein.

According to a further aspect of the invention, there is provided an attractant for facilitating the oviposition of the *culex* species of mosquitoes, wherein the attractant is a nitrogen-phosphorus-potassium additive.

According to a still further aspect of the invention, there is provided an attractant for facilitating the oviposition of the *culex* species of mosquitoes, wherein the attractant is an pheromone analogue, its enantiomer or racemic mixture according to formula (I) or formula (II):

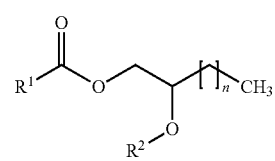

formula (I)

wherein:
$R^1$ is a $C_1$-$C_5$ linear or branched alkyl group which may be unsubstituted or substituted by one or more alkoxy, carboxyl or amide group;
$R^2$ is a $C_1$-$C_4$ linear or branched alkyl group which may be unsubstituted or substituted by one or more alkoxy, carboxyl or amide group; and
n is 3-16;

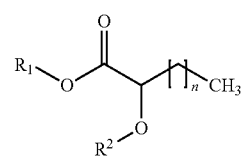

formula (II)

wherein:
$R^1$ is a $C_1$-$C_6$ linear or branched alkyl group which may be unsubstituted or substituted by one or more alkoxy, carboxyl or amide group;)
$R^2$ is a $C_1$-$C_4$ linear or branched alkyl group which may be unsubstituted or substituted by one or more alkoxy, carboxyl or amide group; and
n is 3-16;
or as shown in following:

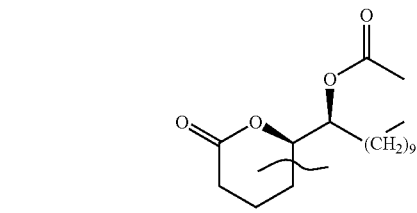

A series

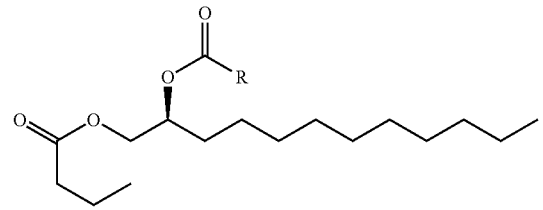

[(2S)-2-acetoxydodecyl] butanoate

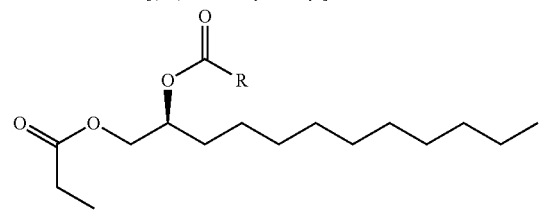

[(2S)-2-acetoxydodecyl] propanoate

-continued

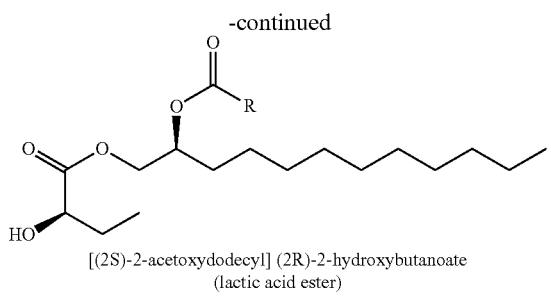

[(2S)-2-acetoxydodecyl] (2R)-2-hydroxybutanoate
(lactic acid ester)

B series

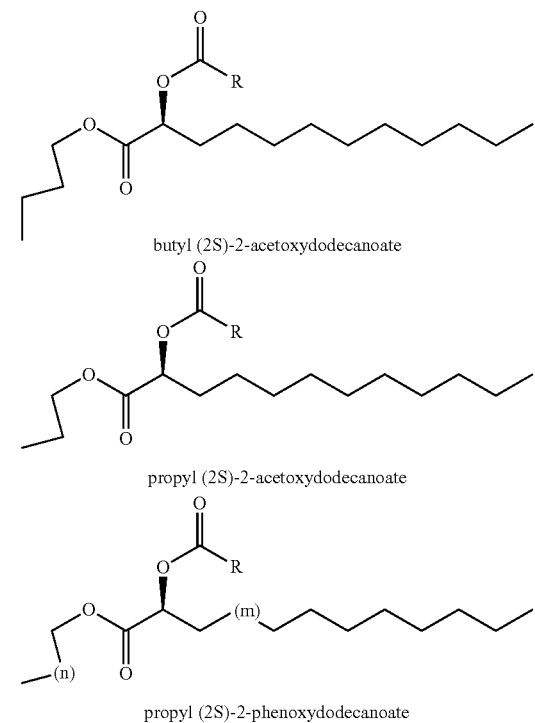

butyl (2S)-2-acetoxydodecanoate propyl (2S)-2-acetoxydodecanoate propyl (2S)-2-phenoxydodecanoate n = $(CH_2)a$ where a = 1-10, total chain length = 1-10, preferably 3C
m = $(CH_2)b$ where b = 1-10, total chain length = 1-20, preferably 18C
R= $CH_3$, $CH_2CH_3$, Ph, 4-methylPh In one embodiment, the attractant further includes N—P—K additive, and the N—P—K additive is a mixture that contains chemical elements nitrogen, phosphorus and potassium.

According to another aspect of the present invention, there is provided a method for facilitating the oviposition of mosquitoes. The method comprising the steps of providing the composition described above or the attractants described above in an environment. In one embodiment, the environment is an ovitrap.

BRIEF DESCRIPTION OF THE DRAWINGS

These and other features, aspects and advantages of the invention will become better understood with regard to the following description and accompanying drawings wherein.

DESCRIPTION OF THE INVENTION

Figure 1:
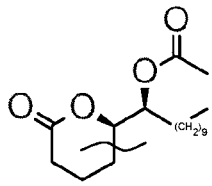
FIG. 1 shows the pheromone analogues of the present invention.
Figure 1:
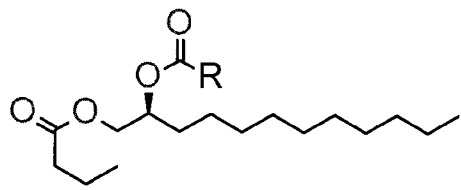
Figure 1:
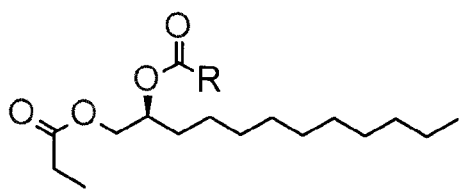
Figure 1:
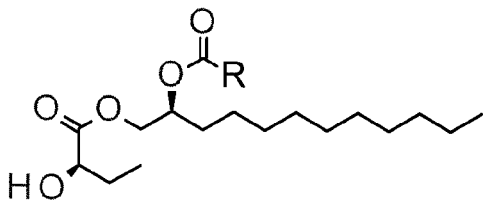
Figure 1:
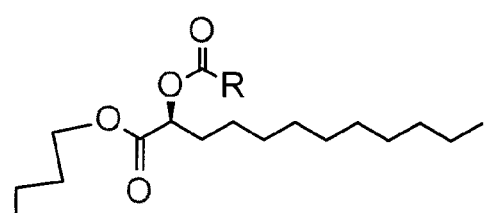
Figure 1:
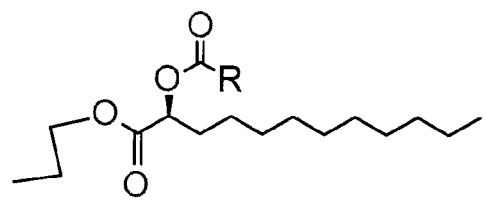
Figure 1:
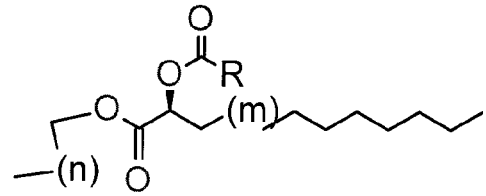

The following description is of preferred and alternative embodiments by way of example only. Many variations on the specific structures and methods described below may be realized by those knowledgeable in the field of the invention, without departing from the scope of the invention and the claims which define the invention, regardless of whether or not such variations are expressly described.

Different Culicidae species harbour different disease vectors. For example, the *Culex* species is known to transmit West Nile virus, the *Aedes* species is known to transmit Dengue Fever, and the *Anopheles* species is known to transmit Malaria. It is also known that each species of mosquito relies on different environmental cues to determine where a gravid mosquito should oviposit. Although other factors, such as light and temperature, have an effect on the oviposition of the mosquito, chemoattractants have an important role in the preferred oviposition of the mosquito.

The current invention provides a composition for affecting the behaviour of controlling mosquito populations. More specifically, the composition is used for attracting mosquito to a target, such as a mosquito trap, mosquito ovitrap or artificial pool. More specifically, it is for directing the oviposition of mosquitoes.

The composition comprises one or more attractants that can attract gravid female mosquitoes to deposit their eggs, and a nitrogen-phosphorus-potassium (N—P—K) additive. Typically, the nitrogen, phosphorus and potassium elements are provided in the form of $NH_4^+$, $PO_4^{3-}$ and $K^+$, but other salts can also be used.

The weight ratio of the attractants to N—P—K additive in the composition could be rational, preferably between 0.01-100 or more specifically, 0.1-10.

The N—P—K additive can be in the form of a N—P—K fertilizer with any NPK value. For example, the NPK value in the N—P—K additive could be between 10-50:10-60:10:60, preferably 10-25:10-30:10-25, or 17-20:23-30:17-20. In some embodiments, the NPK value is 17:23:17, or 18:24:16.

As mentioned above, the N—P—K elements are generally provided in the form of $NH_4^+$, $PO_4^{3-}$ and $K^+$. However, these elements can be provided from a variety of individual sources. For example, a single source material, such as potassium phosphate, could provide two or more of these elements. Potential sources of nitrogen include ammonium compounds, such as, but not limited to, ammonium dihydrogen phosphate, ammonium acetate and ammonium chloride. The phosphorus component of the composition can be provided in the form of a phosphate compound, such as, but not limited to, sodium phosphate dibasic and potassium phosphate, whereas the potassium component can be additional provided in the form of potassium chloride.

In some embodiments, the N—P—K additive could be in the form of a N—P—K fertilizer with any NPK value. For example, the NPK value of the fertilizer could be between 10-50:10-60:10:60, preferably 10-25:10-30:10-25, or 17-20:23-30:17-20. In some embodiments, the NPK value is 17:23:17, or 18:24:16.

Attractants for use in the composition are the substances known to direct the oviposition (egg laying) of gravid female mosquitoes. Attractants that are dispersed within the composition are liberated to their surroundings and their scent is picked up by gravid female mosquitoes which follow the scent to its source and deposit their eggs. The amount and type of attractant can be adjusted to be species specific. Slow release or longer lasting attractants are preferred to minimize the maintenance time required for a trap using such attractants.

The attractants may be one or more known semiochemicals or natural mosquito attractants. For example, the attractants could be one or more of substances selected from: 1) carboxylic acids and esters, in particular, decanoic acid, dodecanoic acid, tetradecanoic acid, tetradecanoic acid methyl ester, hexadecanoic acid, hexadecanoic acid methyl ester, or octadecanoic acid, or a combination of one or more, such as, propyl octadecanoate, n-heneicosane, tetradecanoic acid methyl ester; 2) alkyl aldehyde, such as nonaldehyde; 3) amine compound, such as triethylamine; 4) phenol compound, such as p-cresol; 5) indole compounds, such as 3-methylindole and 4-methylindole; and 6) other natural or synthetic mosquito attractants, or any substance that can produce mosquito attractants, for example, a natural pheromone released by a mosquito during the egg laying process or released during hatching of the egg. Moreover, the attractant can be an analogue of natural pheromone that is produced by a chemical process.

A variety of additives may also be incorporated into the composition of the invention to improve efficiency of the composition. Any substance that can enhance the physical or chemical characteristics of the attractants or the N—P—K additive can also be included. such as antibacterial and preservatives can also be included.

The compositions described herein are purposed to attract gravid mosquitoes to oviposit in a preferred environment. In other words, by adding one of the compositions described herein to a basin with water, which may act as a trap, to create an artificial environment, the gravid mosquito will be more inclined to deposit her eggs in the artificial environment over naturally occurring pools of water. If the basin is part of an ovitrap, such as those described in CA2623601 and CA2756221, then the eggs or newly hatched larvae can be trapped, which eventually lowers the mosquito population of the area surrounding the trap.

The composition can be dissolved in water directly or suspended in water as a small package to keep a certain concentrate of the composition in the water.

When an ammonium compound is provided as the source of nitrogen, about 10 mg/L to about 25 mg/L of N may be added to solution. The same applies to the phosphate component of the composition. In some formulations, about 10 mg/L or about 30 mg/L of either compound may be added to the basin. With respect to potassium, when this compound is provided as the source of potassium, about 10 mg/L to about 30 mg/L may be added to the composition. In some formulations, about 23 mg/L or about 30 mg/L of compound may be added to the basin.

The compositions described herein can be provided as an additive to an already existing breeding pool for mosquitoes, or can be provided in a basin to create an artificial breeding pool for gravid mosquitoes to lay their eggs. The actual formulation of the composition will be determined based on the species of mosquitoes found in the area. Where more than one species of mosquito is found in an area, multiple artificial pools may be setup, each one purposed to attract a specific species of mosquito.

EXAMPLES

The compositions described below represent certain exemplary formulations that can be used to attract different species of mosquito.

Example 1

Composition for *Anopheles* Species of Culicidae

For the purposes of providing a composition for facilitating the oviposition for the potential malaria carrying *Anopheles* species of Culicidae. The composition described above may include the N—P—K additive and propyl octadecanoate. The NPK value of the N—P—K additive is between 10-25:10-30:10-25, or more preferably 17-20:23-30:17-20. In some embodiments, the NPK value can be 17:23:17, or 18:24:16. In one exemplary embodiment, the N—P—K additive is a fertilizer with NPK value of 17:23:17.

By way of example only, one potential formulation of the composition is: a N—P—K additive 100 parts (weight) and 1 to 50 parts (weight) propyl octadecanoate.

By way of example only, the composition for the facilitating the oviposition of the *Anopheles* species of Culicidae includes about 17 mg/L of an ammonium compound, about 23 mg/L of a phosphate compound, about 17 mg/L of a potassium containing compound, and about 1 to about 50 mg/L of propyl octadecanoate in an aqueous solution in one particularly useful embodiment, 101-15 mg of a 17:23:17 N—P—K fertilizer is dissolved in water and 1-50 mg/l of propyl octadeconate is added to the solution to produce the composition of the present invention.

The solution described above is added to a basin of an ovitrap, such as those described in CA2623601 and CA2756221. Mosquitoes are attracted to the solution and lay eggs in the solution, and then the eggs or newly hatched larvae can be trapped, which eventually lowers the mosquito population of the area surrounding the trap.

A modified ovitrap containing the solution above was tested in a field study in Zayaxche, Guatemala, and the results showed that different species of *Anopheles* mosquitoes were attracted to the solution providing an average larval density (LD) of 338 for *Anopheles* albimanus, 1000 for *Anopheles* pseudopuctipennis and 167 for *Anopheles* darlingi. These results indicate a very strong and selective attraction.

Other kind of attractants for the *Anopheles* species of Culicidae can also be included in the composition.

Example 2

Composition for *Aedes* Species of Culicidae

The composition described can be modified for facilitating the oviposition of the *Aedes* species of Culicidae. In this case, the composition can include N—P—K additive and cooked or uncooked whey.

Further, propyl octadecanoate, n-heneicosane and/or tetradecanoic acid methyl ester can be added.

Whey is liquid remaining after milk has been curdled and strained. Preferably, cooked whey, as used herein, is whey that has been heated or cooked to get rid of some or all proteins. The whey is heated or cooked, for example, at a temperature of 60-100° C. for 10 Minutes to 2 hours, more specially, the whey is boiled at 100° C. Preferably, the cooked whey is filtered to get rid of the agglomerated proteins.

For example, the whey of the present invention can be prepared by adding one tablet of commercial rennet (animal or vegetable source) to one gallon of warm, approximately 40° C. homogenized milk in a ratio of 1:10,000-15,000 (based on weight). The mixture is stirred gently for a few minutes (such as 2 minutes to 15 minutes), then left to rest for at least one hour. Optionally, an acid, such as lemon juice or vinegar, can be added to the mixture to promote coagulation of the whey proteins. The agglomerated proteins are filtered out using a fine cloth. Filtered yellowish liquid is collected to get the whey.

The cooked whey can be used directly or it can be further boiled at approximately 100° C. for approximately 30 minutes. The solution is then filtered again using a fine cloth to get rid of agglomerated proteins. The residual solution is stored at a low temperature (such as 4° C. or below) and added to the composition.

The composition described may include N—P—K additive and cooked whey, wherein the ratio is about 1 ml to about 10 ml cooked whey per 100 mg N—P—K.

The composition may further comprise 1-50 mg of propyl octadecanoate and/or 1-100 parts of n-heneicosane, per 100 mg N—P—K.

In the solution, the cooked whey is in a concentration from about 1 ml/L to about 10 ml/L.

In the solution, the n-heneicosane is in a concentration from about 1 ml/L to about 100 ml/L.

To further enhance the chemoattractive properties of the composition, the mixture can be supplemented with tetradecanoic acid methyl ester in a ratio of about 1 mg to about 100 mg per 100 mg N—P—K additive.

In the solution, the tetradecanoic acid methyl ester is in a concentration from about 1 mg/L to about 100 mg/L.

By way of example only, one formulation of the composition for the facilitating the oviposition of the *Aedes* species of Culicidae comprises: 100 mg of N—P—K additive, in a 17:23:17 formulation; and mosquito attractant, which comprises 10 mg of propyl octadecanoate, 1.25 ml of cooked whey, 10 mg of n-heneicosane and about 10 mg of tetradecanoic acid methyl ester.

The above composition can be dissolved in water at a ratio of 100 mg N—P—K in 1 L aqueous solution, in a 17:23:17 formulation, 10 mg/L of propyl octadecanoate, 1.25 ml/L of cooked whey, 10 mg/L of n-heneicosane and about 10 mg/L of tetradecanoic acid methyl ester in the aqueous solution.

Another potential formulation of the composition for the facilitating the oviposition of the *Aedes* species of Culicidae comprises: the N—P—K additive, and mosquito attractant, which comprises 1-10 ml of cooked whey and 1-100 mg of n-heneicosane per 100 mg N—P—K additive; more specifically, the attractants comprises 1.25 ml of cooked whey and 10 mg of n-heneicosane per 100 mg N—P—K additive. The N—P—K additive, in which 17 parts of ammonium compound, about 23 parts phosphate compound, about 17 parts of a potassium containing compound can be a fertilizer with NPK value of 17:23:17.

The composition can be dissolved in water at a ratio of 100 mg N—P—K in 1 L solution, in a 17:23:17 formulation, about 10 mg/L of propyl octadecanoate, about 1.25 ml/L of cooked whey, about 10 mg/L of n-heneicosane and about 10 mg/L of tetradecanoic acid methyl ester in an aqueous solution.

The above solution can be added to the basin of an ovitrap, such as those described in CA2623601 and CA2756221. Mosquitoes are attracted to the solution and lay eggs in the solution, and then the eggs or newly hatched larvae can be trapped, which eventually lowers the mosquito population of the area surrounding the trap.

When the above solution was tested in the field using 50 modified ovitraps, during the mosquito season in Mexico, close to 300,000 eggs were collected on landing strips. Larvae present in the solution prior to filtration were also destroyed and not accounted for. The calculated reduction of the adult *Aedes* spp. mosquitoes where the modified ovitraps containing the composition were placed approached 70-80% compared to two untreated sites.

Other kind of attractants for the *Aedes* species of Culicidae can also be included in the composition.

Example 3

Composition for *Culex* Species of Culicidae

In this example, the composition disclosed herein was modified to provide a composition for facilitating the oviposition of the *Culex* species of Culicidae.

In the first case, in conjunction with a N—P—K additive, the attractants of the composition include: dehydrated alfalfa, 3-methylindole, an alkyl aldehyde, triethylamine and/or p-cresol.

This composition can modified to include dehydrated alfalfa at a concentration of 1-2.5 g dehydrated alfalfa per 100 mg N—P—K additive. The dehydrated alfalfa can be dry leaves of alfalfa. It can also be in the form of commercial rabbit chow, examples are Purina's Rabbit Chow™ product, such as Purina® Rabbit Chow™ Complete and Purina® Rabbit Chow™ professional. In the solution, the dehydrated alfalfa may be provided in a concentration from about 1 g/L to about to 2.5 g/L.

In addition to the dehydrated alfalfa, the composition may include yeast, also from commercially available sources such as horse food supplement or baker's yeast. The yeast can be provided at a concentration of 0.1-0.25 g per 100 mg N—P—K. In the solution, the yeast may be provided in a concentration from about 0.1 g/L to about 0.25 g/L. Without wishing to be bound by theory, it is believed that yeast enhances the attractant qualities of the alfalfa.

The attractive properties of the composition can also be enhanced by including 3-methylindole. The ratio of the 3-methylindole could be 0.1-10 mg per 100 mg N—P—K additive. In the solution, the concentration of 3-methylindole can be from about 0.1 mg/L to about 10.0 mg/L.

The composition can further include other kind of attractants that can be used to attracting *Culex* species of Culicidae. For example, the composition can include an alkyl aldehyde, such as Nonanal, in a ratio of 0.5-2 mg per 100 mg N—P—K additive. The concentration in the solution is from about 0.5 mg/L to about 2 mg/L. The composition can also include triethylamine in a ratio of 0.5-1.5 mg per 100 mg N—P—K additive. The concentration is from about 0.5 mg/L to about 1.5 mg/L. It is also beneficial to include p-cresol in a concentration in a ratio of 1-100 mg per 100 mg N—P—K additive. The concentration is from about 1 mg/L to about 100 mg/L.

By way of example only, one embodiment of the composition for the facilitating the oviposition of the *Culex* species of Culicidae comprises: 100 parts N—P—K additive, 500 parts dehydrated alfalfa, 100 parts yeast, 2.5 parts of Nonanal, and about 2.5 parts of p-cresol.

In the solution, about 705 mg composition is dissolved in water to form a 1 L solution of about 100 mg/l N—P—K additive (in a 17:23:17 formulation), about 500 mg/L dehydrated alfalfa, about 0.1 g/L yeast, about 2.5 mg/L of Nonanal and about 2.5 mg/L of p-cresol in an aqueous solution.

The above solution is added to the basin of ovitraps, such as those described in CA2623601 and CA2756221. Mosquitoes are attracted to the solution and lay eggs in the solution, and then the eggs or newly hatched larvae can be trapped and destroyed, which eventually lowers the mosquito population of the area surrounding the trap. The result shows that the composition with N—P—K additive is more attractive than those without N—P—K additive.

An ovitrap with the above solution was tested in a large field study and the results showed that when 150 modified ovitraps were used in 12 selected sites around the city of Sudbury, Ontario, Canada during mosquito season. 11196 rafts were collected and counted in 90 days, namely 870 rafts per week and total of 3,358,800 eggs were destroyed. Larvae present in the solution prior to filtration were also destroyed and were not accounted for. The overall effect of the depletion of the adult *Culex* species of Culicidae mosquitoes in the treated area with modified ovitraps was calculated to be approximately 80-90%.

In another case, the composition for oviposition of *Culex* species of Culicidae includes an attractant which is pheromone analogue as shown in FIG. 1, an enantiomer or racemic mixture thereof. These pheromone analogues are useful oviposition pheromones, having the same or greater efficiency compared to natural pheromones, which are released by the mosquitoes during the egg laying process. In particular, the pheromone analogues include: [(2S)-2-acetoxydodecyl]butanoate, [(2S)-2-acetoxydodecyl]propanoate, [(2S)-2-acetoxydodecyl](2R)-2-hydroxybutanoate, butyl (2S)-2-acetoxydodecanoate, propyl(2S)-2-acetoxydodecanoate or propyl(2S)-2-phenoxydodecanoate, administered in any of its enantiomeric forms or as a racemic mixture.

Although some of the analogues as shown in FIG. 1 can occur naturally, it is preferred to prepare them synthetically for use as oviposition attractants. The pheromone analogues can be produced by following processes:

1. Synthesis of Acetate Esters Analogues of the Natural Pheromone of *Culex* Spp. Mosquitoes.

Figure 2:
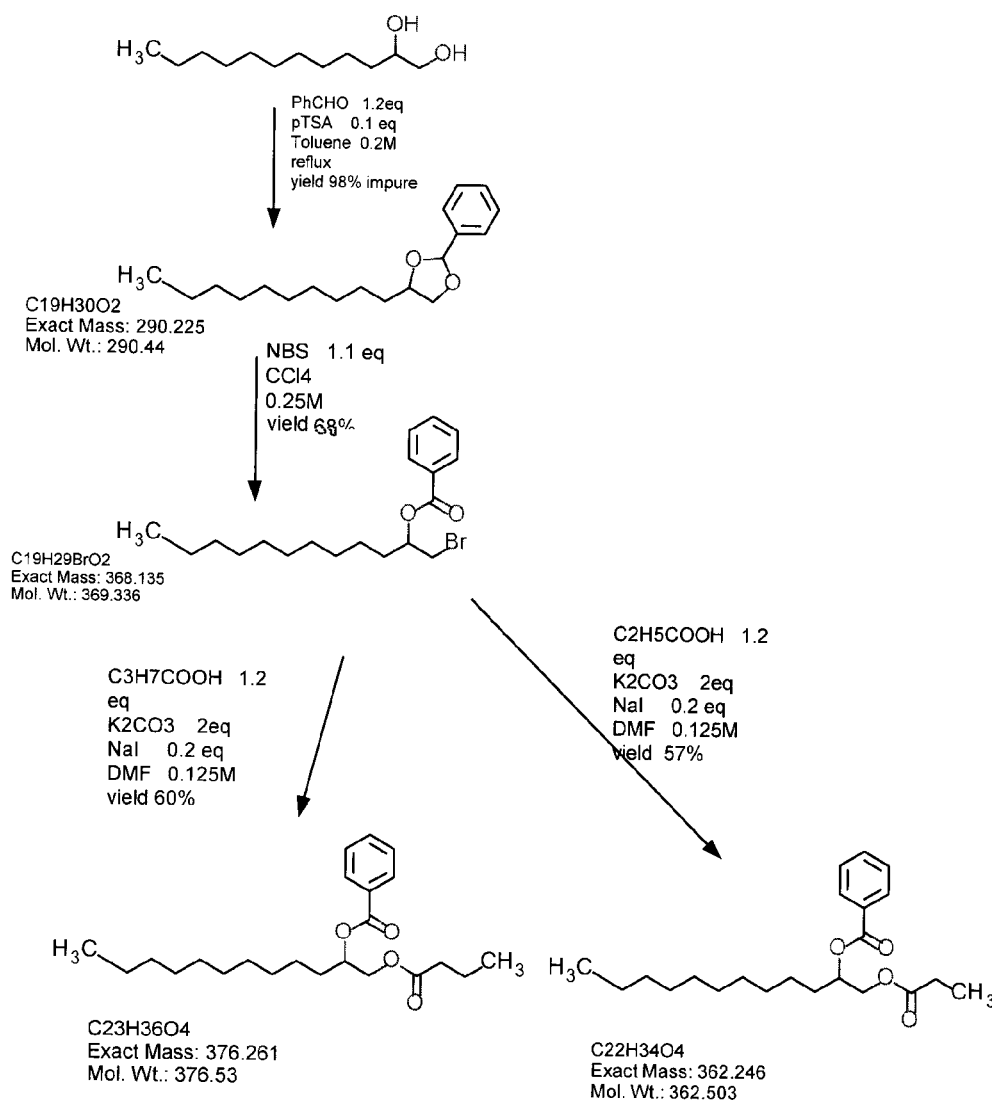
FIG. 2 is a diagram of synthesis of acetate esters analogues of the natural pheromone of *Culex* spp. mosquitoes.

As shown in FIG. 2, the process involves selectively protecting the primary alcohol of the commercially available 1,2-dodecandiol using the bulky terbutyldimethylsilane chloride in the presence of triethylamine and a catalytic amount of DMAP to give 1-[(tert-butyldimethylsilyl)oxy]dodecan-2-ol in quantitative yield.

Then, the 1-[(tert-butyldimethylsilyl)oxy]dodecan-2-ol is dissolved in dichloromethane and treated with acetic anhydride in the presence of pyridine/DMAP to give the 1-[(tert-butyldimethylsilyl)oxy]dodecan-2-yl acetate in a quantitative yield. 1-[(tert-butyldimethylsilyl)oxy]dodecan-2-yl acetate is deprotected using a 1M solution of tetrabutylammonium fluoride to give the 1-hydroxydecane-2-yl acetate in quantitative yield. Propyl and butyl esters of 1-hydroxydecane-2-yl acetate are made by reacting this compound in the presence of N,N'-Diisopropylcarbodiimide to provide the esters 2-(acetoxy)dodecyl propanoate and 2-(acetoxy)dodecyl butanoate in 71% and 85%, respectively.

2. Synthesis of Benzoate Ester Analogues of the Natural Pheromone of *Culex* Spp. Mosquitoes.

Figure 3:
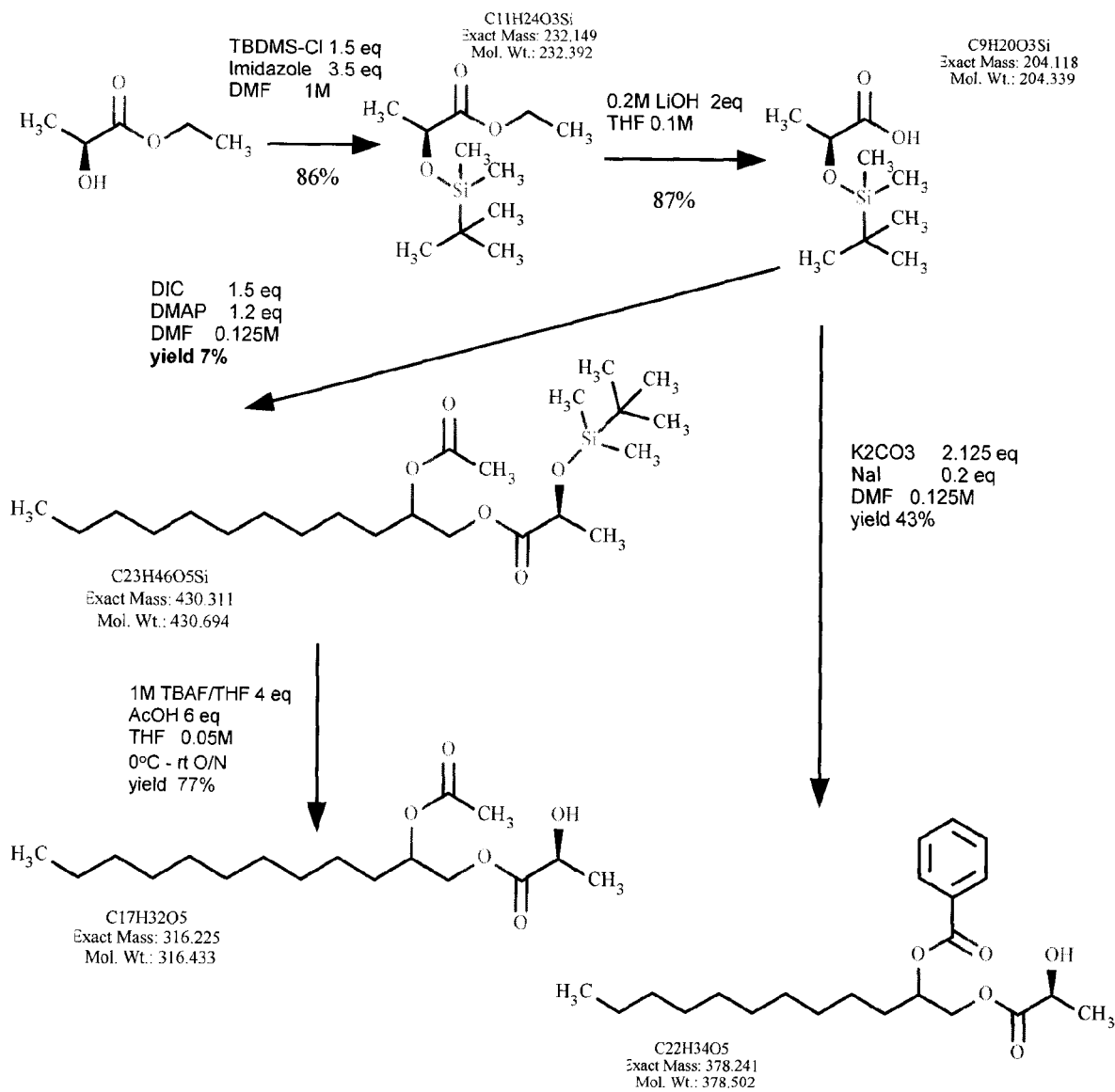
FIG. 3 is a diagram of synthesis of benzoate ester analogues of the natural pheromone of *Culex* spp. mosquitoes.

As shown in FIG. 3, the benzonate analogue is produced by following process, namely, the commercially available 1,2-dodecandiol is protected forming the 1,3-dioxane with benzaldehyde under dehydrating conditions using a Dean-Stark apparatus. The 4-decyl-2-phenyl-1,3-dioxolane dodecane-1,2-diol is obtained in quantitative yield.

The 4-decyl-2-phenyl-1,3-dioxolane dodecane-1,2-diol is then dissolved in tetrachloromethane and N-bromosuccinamide is added to give 1-bromododecan-2-yl benzoate in 68% yield.

Propyl and butyl esters are made by reacting 1-bromododecan-2-yl benzoate in dimethylformamide and the appropriate acid in the presence of a catalytic amount of Sodium Iodide. The yield of 1-(benzoyloxy)undecyl propanoate and the 1-(benzoyloxy)undecyl butanoate are 58% and 60% respectively.

3. Synthesis of an Inverted Ester of the Acetate Analogue of the Natural Pheromone of *Culex* spp. Mosquitoes.

Figure 4:
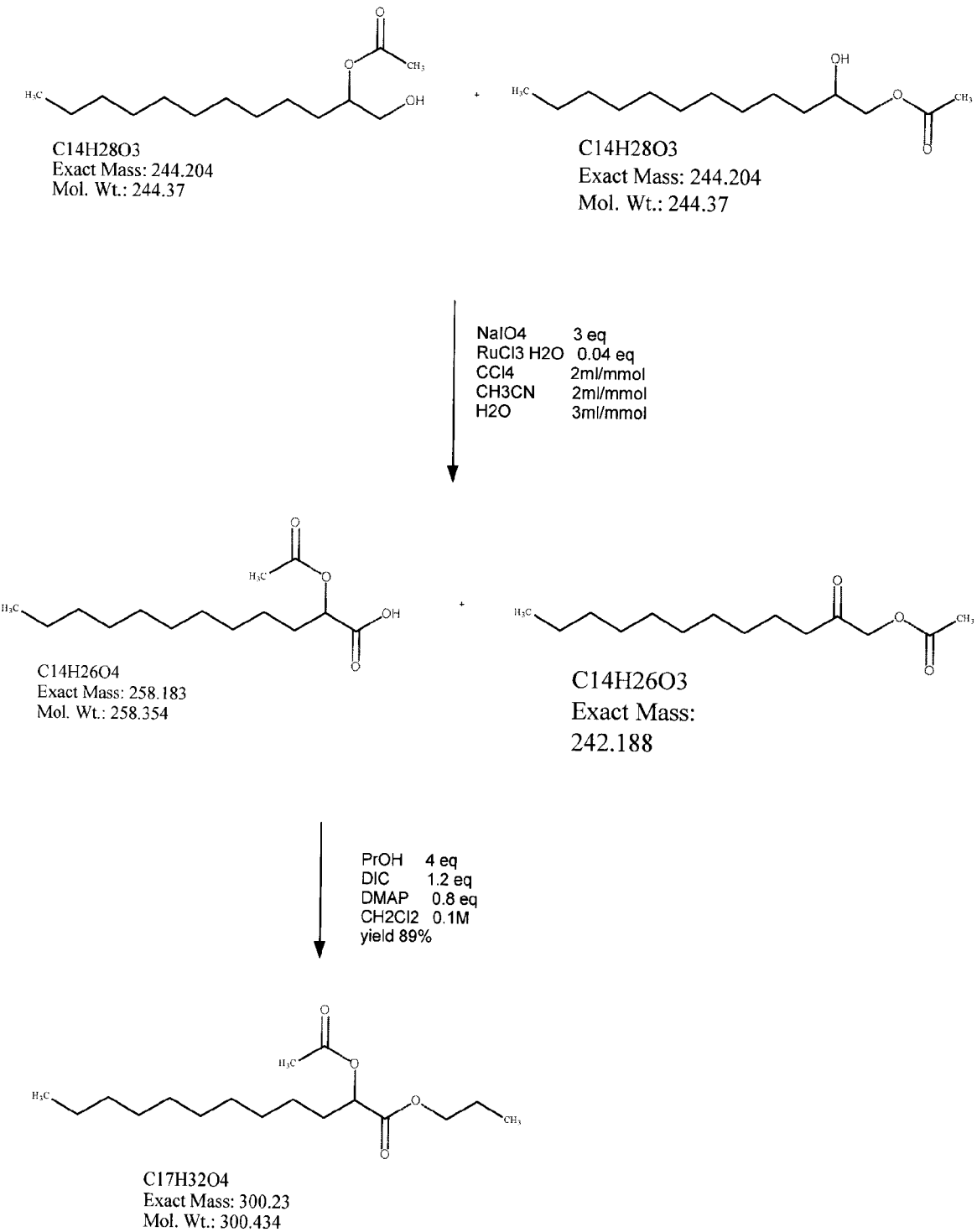
FIG. 4 is a diagram of synthesis of an inverted ester of the acetate analogues of the natural pheromone of *Culex* spp. mosquitoes.
Figure 5:
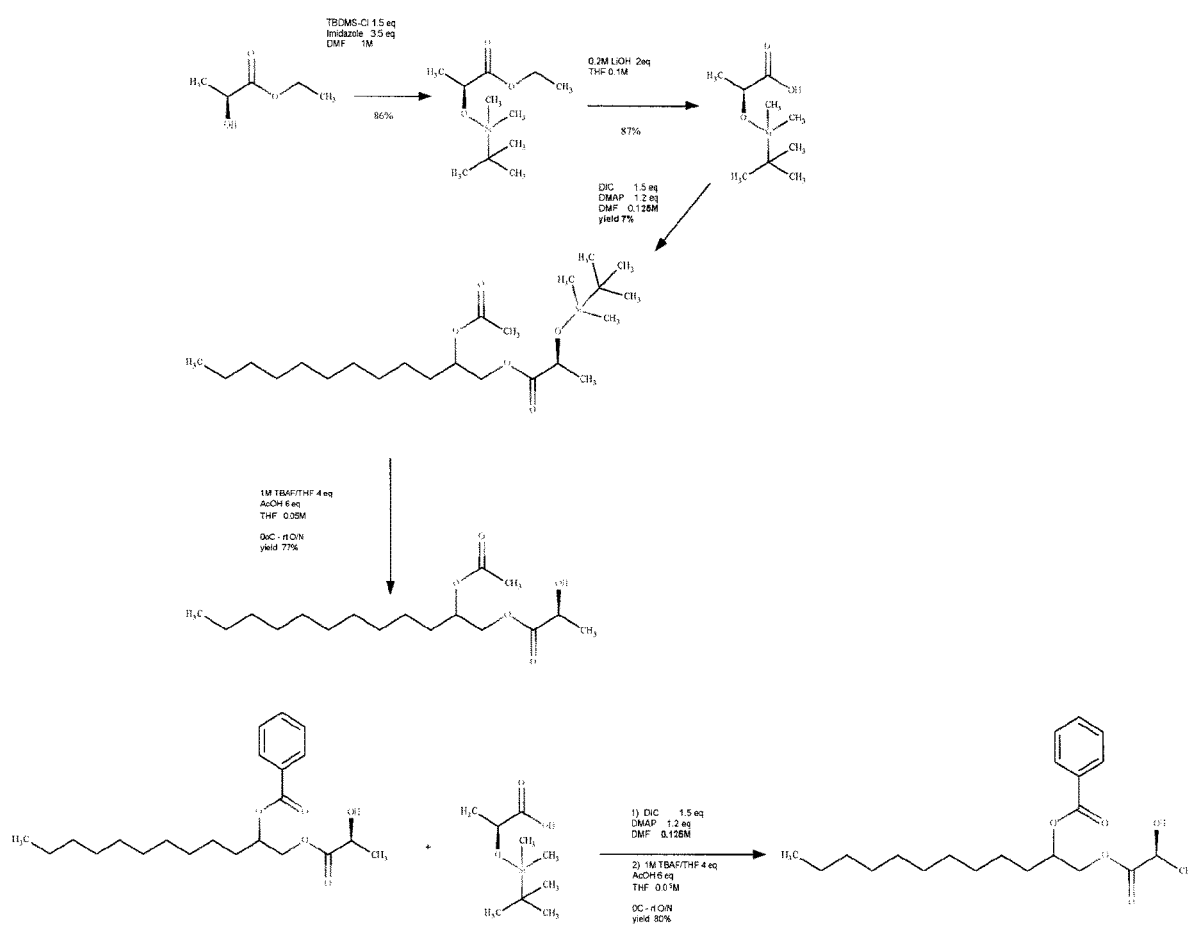
FIG. 5 is a diagram of synthesis of esters of lactic acid analogues of the natural pheromone of *Culex* spp. mosquitoes.

As shown in FIG. 4, the process of synthesis of an inverted ester of the acetate anologues involves the following process. The commercially available 1,2-dodecandiol was selectively protected at the primary alcohol using the bulky terbutyldimethylsilane chloride in the presence of triethylamine and a catalytic amount of DMAP to give the 1-[(tert-butyldimethylsilyl)oxy]dodecan-2-ol in quantitative yield.

The 1-[(tert-butyldimethylsilyl)oxy]dodecan-2-ol is dissolved in dichloromethane and treated with acetic anhydride in the presence of pyridine/DMAP to give the 1-[(tert-butyldimethylsilyl)oxy]dodecan-2-yl acetate in a quantitative yield.

1-[(tert-butyldimethylsilyl)oxy]dodecan-2-yl acetate is deprotected using a 1M solution of tetrabutylammonium fluoride to give the 1-hydroxydecane-2-yl acetate in quantitative yield.

1-hydroxydecane-2-yl acetate is dissolved in tetrachloromethane and react with sodium tetraiodate in the presence of ruthenium trichoride hydrate to give the 2-(acetoxyloxy) dodecanoic acid and 2-oxododecyl acetate as a minor compound.

2-(acetoxyloxy)dodecanoic acid was activated in dichloromethane with N,N'-Diisopropylcarbodiimide in the presence of propanol to provide the propyl 2-(acetoxy)dodecanoate in 89% yield.

4. Synthesis of Esters of Lactic Acid Analogues of the Natural Pheromone of *Culex* Spp. Mosquitoes.

A commercially available natural optically active lactic acid was protected with the bulky terbutyldimethylsilane chloride in the presence of triethylamine and a catalytic amount of DMAP to give the 2S-2-[(tert-butyldimethylsilyl)oxy]propanoic acid in 87% yield.

The commercially available 1,2-dodecandiol is selectively protected at the primary alcohol using the bulky terbutyldimethylsilane chloride in the presence of triethylamine and a catalytic amount of DMAP to obtain the 1-[(tert-butyldimethylsilyl)oxy]dodecan-2-ol in quantitative yield.

The 1-[(tert-butyldimethylsilyl)oxy]dodecan-2-ol is dissolved in dichloromethane and treated with acetic anhydride in the presence of pyridine/DMAP to give the 1-[(tert-butyldimethylsilyl)oxy]dodecan-2-yl acetate in a quantitative yield.

1-[(tert-butyldimethylsilyl)oxy]dodecan-2-yl acetate is deprotected using a 1M solution of tetrabutylammonium fluoride to obtain the 1-hydroxydecane-2-yl acetate in quantitative yield.

1-hydroxydecane-2-yl acetate is condensed with the 2S-2-[(tert-butyldimethylsilyl)oxy]propanoic acid in the presence of N,N'-Diisopropylcarbodiimide to obtain the 2-(acetoxy) dodecyl-(2S)-2-[tert-butyldimethylsilyl)oxy]propanoate.

Treatment of 2-(acetoxy)dodecyl-(2S)-2-[tert-butyldimethylsilyl)oxy]propanoate with tetrabutylammonium fluoride solution obtain the corresponding 2-(acetoxy)dodecyl-(2S)-2-hydroxypropanoate a 77% yield.

Treatment of 2-(benzoyloxy)dodecyl-(2S)-2-[tert-butyldimethylsilyl)oxy]propanoate with tetrabutylammonium fluoride solution produces the corresponding 2-(benzoyloxy)dodecyl-(2S)-2-hydroxypropanoate a 80% yield.

Moreover, it will be appreciated that the compounds described herein may also be prepared by other procedures than those described, particularly by other procedures described in the art for the preparation of related compounds of a similar type.

Even though those pheromone analogues alone can effectively direct the oviposition of *Culex* species of Culicidae, a N—P—K additive could also be added to the attractant pheromone analogues to enhance the ability to attract gravid mosquitoes. The ratio of pheromone analogues is 1 to 30 mg per 100 mg of N—P—K additive. In solution, the concentrate of the compounds is 1 mg/L to 30 mg/L.

In one embodiment, the composition comprises 100 mg N—P—K additive and 30 mg pheromone analogues, a 1 L solution. This solution is added to a basin of an ovitrap, such as those described in CA2623601 and CA2756221. Mosquitoes are attracted to the solution and lay eggs in the solution. The eggs or newly hatched larvae can be trapped, which eventually lowers the mosquito population of the area surrounding the trap.

These synthetic pheromone analogues can also be added to the solutions described in Examples 1 and 2 to enhance the oviposition of *Culex* species of Culicidae.

The present invention has been described with regard to illustrative embodiments. However, it will be obvious to persons skilled in the art that a number of variations and modifications can be made without departing from the scope of the invention as described herein.

The invention claimed is:

1. A composition for directing the oviposition of mosquitoes, said composition comprises a liquid cooked whey mixture and a nitrogen, phosphorus and potassium (N—P—K) additive, wherein the liquid cooked whey mixture comprises the liquid component that remains after whey has been heated or cooked at a temperature of 60° C.-100° C. for 10 minutes to 2 hours and is then filtered to remove agglomerated proteins and wherein the liquid cooked whey mixture is provided at a ratio of 1-10 ml cooked whey per 100 mg N—P—K additive.

2. The composition of claim 1, wherein the nitrogen, phosphorus and potassium elements in the N—P—K additive are provided in the form of $NH_4^{+}$,+$PO_4^{3-}$and $K^+$.

3. The composition of claim 1, wherein the N—P—K additive is a fertilizer.

4. The composition of claim 3, wherein the NPK value of the N—P—K additive is in the range of 10-25:10-30:10-25.

5. The composition of claim 3, wherein the NPK value of the N—P—K additive is 17:23:17 or 18:24:16.

6. (Presented Presented) The composition of claim 1, further comprising one or more attractants selected from: carboxylic acids and esters, alkyl aldehyde, amine compound, phenol compound, indole compounds, and other natural or synthetic mosquito attractants.

7. The composition of claim 1, further comprising one or more attractants selected from: decanoic acid, dodecanoic acid, tetradecanoic acid, tetradecanoic acid methyl ester, hexadecanoic acid, hexadecanoic acid methyl ester, propyl octadecanoate, n-heneicosane, nonaldehyde, triethylamine, p-cresol, 3-metylindole, 4-metylindole, and dehydrated alfalfa.

8. The composition of claim 7, wherein the one or more attractants comprise propyl octadecanoate at a ratio of 1-50 mg propyl octadecanoate per 100 mg N—P—K additive.

9. The composition of claim 1, further comprising n-heneicosane, at a ratio of 1-100 mg n-heneicosane per 100 mg N—P—K additive.

10. The composition of claim 1, further comprising propyl octadecanoate at a concentration of 1-50 mg per 100 mg N—P—K additive or tetradecanoic acid methyl ester at a ratio of 1-100 mg per 100 mg N—P—K additive or a combination thereof.

11. The composition of claim 10, wherein the propyl octadecanoate is provided at a concentration of 10 mg per 100 mg N—P—K additive or tetradecanoic acid methyl ester is provided at a ratio of 10 mg per 100 mg N—P—K additive or a combination thereof.

12. The composition of claim 1, further comprising dehydrated alfalfa at a ratio of 1-2.5 g dehydrated alfalfa per 100 mg N—P—K additive.

13. The composition of claim 12, further comprising yeast at a ratio of 0.1-0.25 g yeast per 100 mg N—P—K additive.

14. The composition of claim 13, further comprising Nonanal and p-cresol at a ratio of 1-2.5 mg Nonanal or 1-2.5 mg p-cresol per 100 mg N—P—K or a combination of both.

15. A method for facilitating the oviposition of mosquitoes, comprising:

adding the composition of claim 1 in an environment.

16. The method as in claim 15, wherein the environment is an ovitrap.

17. The composition of claim 1, wherein the liquid cooked whey mixture is whey that is boiled at about 100° C. for 10 minutes to 2 hours.

* * * * *